UNITED STATES PATENT OFFICE.

CHARLES S. KATZ, OF NEW YORK, N. Y.

PROCESS OF MANUFACTURE OF PANAMA AND TOYO HATS.

1,315,605. Specification of Letters Patent. Patented Sept. 9, 1919.

No Drawing. Application filed March 24, 1919. Serial No. 284,635.

*To all whom it may concern:*

Be it known that I, CHARLES S. KATZ, a citizen of the United States, and a resident of the city of New York, county and State of New York, have invented new and useful Improvements in the Processes of Manufacture of Panama and Toyo Hats.

In the manufacture of hats by the present methods, the hats are first bleached and then glued whereby they become stiff. In order to be able to put the hat over the block, it is steamed and thereby softened and then blocked, after which a filler is applied to the surface. After the hat is dried, it is sandpapered since the steaming leaves the surface of the hat very rough.

The hats as made by this method are pasty, rough and have an odor.

The object of my new process is to provide a hat, which is clear and white in color, odorless and smooth without the aid of sandpapering and which does not require steaming.

In the manufacture of the hat by my process, it is first bleached, then sized by dipping it into a gelatinous substance such as gum tragacanth dissolved in cold water and heated, or gelatin and mixed with formaldehyde to deodorize it, and then allowed to dry partly. While the hat is still somewhat damp, the pores are filled by again dipping it into a solution consisting of following ingredients mixed approximately in the proportions indicated, viz:

Zinc oxid four pounds, magnesium sulfate two pounds, sulfur eight pounds, water four gallons, alcohol one half gallon and glycerin one pound which is then mixed with another solution consisting of one gallon of a gelatinous substance such as Callo sizing (the trade name of a substance made by the American Glue Co., of New York consisting of starch mixed with a gelatinous mixture), or gum tragacanth, and three gallons of water. The hat is then allowed to dry thoroughly after which it is placed into a hydraulic press and formed into shape. In order to soften the hat to be enabled to block it, it is then dipped into a solution consisting of the following ingredients mixed approximately in the proportions indicated, viz: water six gallons, alcohol one half gallon, and glycerin one pound. The hat is then blocked into the desired shape without the use of steam.

After this a filler consisting of the following solution mixed in the proportions indicated is applied to the surface of the hat with a sponge, viz: zinc oxid four pounds, magnesium sulfate two pounds, sulfur eight pounds, alcohol one quarter gallon, a gelatinous substance such as "Callo sizing" or gum tragacanth one gallon, water one gallon, formaldehyde in its commercial state one sixteenth of a pint and glycerin one pound. After the filler is dried the surface of the hat is rubbed off with a clean cloth.

The hat when finished by this process is clear white in color, smooth and odorless.

Having thus described my invention, I claim as new and wish to secure by Letters Patent.

1. A process of manufacture of Panama or toyo hats, consisting of first bleaching the hat, then sizing it by coating with a proper mixture, then filling the pores by coating with a filling mixture after the sizing has partly dried, then applying pressure to the hat, then softening the straw by impregnating it with softening solution, then blocking the hat, then filling the pores at the surface by coating it with a proper filler, substantially as described.

2. A process of manufacture of Panama or toyo hats, consisting of first bleaching the hat, then coating it with a gelatinous substance, then allowing it to dry partly, then coating it with a solution consisting of zinc oxid, magnesium sulfate, sulfur, water, alcohol, a gelatinous substance and glycerin, then subjecting it to pressure, then impregnating it with a solution of water, alcohol and glycerin, then blocking it, then coating it with a solution of zinc oxid, magnesium sulfate, sulfur, alcohol, a gelatinous substance, water, formaldehyde and glycerin, substantially as described.

3. A process of manufacture of Panama or toyo hats, consisting of first bleaching the hat, then dipping it into a mixture of a gelatinous substance and formaldehyde, then allowing it to dry partly, then dipping it into a solution consisting of zinc oxid, magnesium sulfate, sulfur, water, alcohol, a gelatinous substance and glycerin, then forming it into shape under pressure, then dipping it into a solution of water, alcohol and glycerin, then blocking it, then applying to its surface a solution of zinc oxid, magnesium sulfate, sulfur, alcohol, a gelatinous substance, water, formaldehyde and glycerin, substantially as described.

Signed at New York, in the county and State of New York, this 21 day of March, 1919.

CHARLES S. KATZ.